Sept. 14, 1926.  E. F. W. ALEXANDERSON  1,600,204
MEANS FOR TRANSMITTING ANGULAR MOTION
Filed Nov. 28, 1924
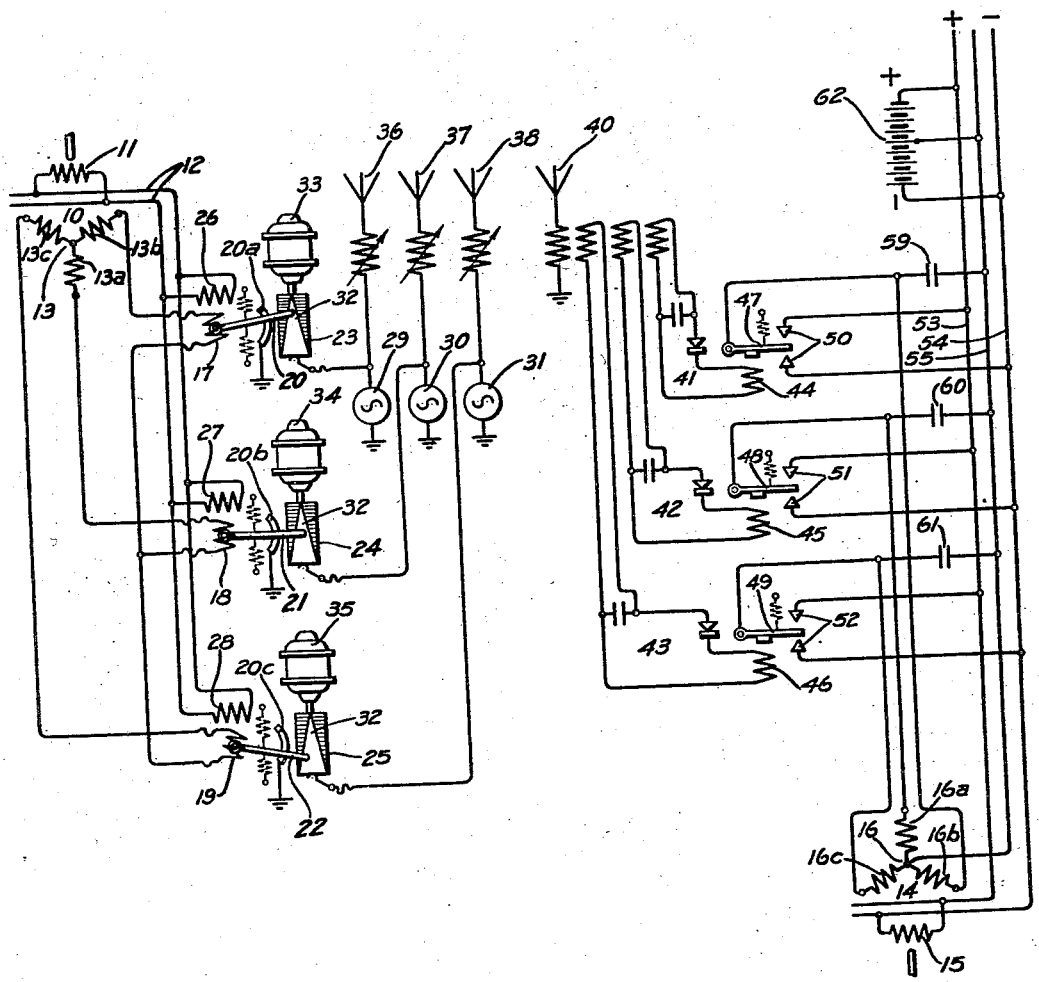
Inventor:
Ernst F. W. Alexanderson
by
His Attorney.

Patented Sept. 14, 1926.

1,600,204

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

MEANS FOR TRANSMITTING ANGULAR MOTION.

Application filed November 28, 1924. Serial No. 752,737.

My invention relates to means for transmitting angular motion and has for its object the provision of means for transmitting motion through the agency of electromagnetic impulses.

In the transmission of the angular motion of an object to a remote point, electrical transmitting and receiving or reproducing devices are often used, the transmitting device being driven by the object. Rotation of the transmitter by the object varies the electrical conditions of the transmitter and these changed electrical conditions of the transmitter are impressed on the distant receiver or reproducer through the medium of electrical conductors connecting the two devices.

In carrying out my invention I transmit the various electrical conditions of the transmitter in terms of impulses of radiated energy which are received by a suitable receiving station at the point to which the motion is to be transmitted and translated back by means of suitable apparatus to the electrical conditions to which the motion receiver is responsive.

For a more complete understanding of my invention reference should be had to the accompanying drawing, the single figure of which shows in diagrammatic form a system for transmitting angular motion embodying my invention.

Referring to the drawing, I have shown my invention in one form as applied to motion transmitting and receiving or reproducing device of the type having a single circuit field winding supplied with alternating current and a polycircuit armature winding associated with it. The transmitting device 10 comprises a single circuit field winding 11 which is connected to a suitable source of alternating current supply 12, and a polycircuit armature winding 13 shown as physically similar to a Y-connected, 3-phase armature winding and provided with coils 13$^a$, 13$^b$ and 13$^c$. One or the other of the two windings preferably the field winding, is rotatably mounted and geared or otherwise mechanically connected to an object (not shown) the angular motion of which is to be transmitted. The receiving device 14 is similar in construction, it being provided with a single circuit field winding 15 on its rotor member and a 3 circuit armature winding 16 consisting of Y-connected coils 16$^a$, 16$^b$ and 16$^c$.

In the operation of such transmitting and receiving devices, corresponding terminals of the armature coils of the two devices are ordinarily connected together by means of three conductors, the field windings of the two devices being connected to a source of alternating current. The field windings induce electromotive forces in the armature windings, the values of these electromotive forces in the various circuits or coils of each armature winding varying in accordance with the angular position of its field winding. When the two rotors are in corresponding angular positions the electromotive forces induced in the various coils of one armature winding are equal respectively to the electromotive forces induced in the coils of the other winding. Since like points of the armature windings are connected together these electromotive forces are then opposed to each other. Consequently no current is set up. Upon rotation of the field windings of the transmitter, however, a new set of voltages is induced in the armature coils of the transmitter and as a result the voltages of the two devices become unbalanced and currents are set up. These currents result in torques applied to the rotors of the devices, and since the rotor of the transmitting device is held in the new position, the rotor of the receiver is turned to a position in which the electromotive forces again balance, which is a position corresponding to that of the transmitter.

It is obvious that if direct current electromotive forces are applied to the field and armature windings of the receiver, the rotor of the receiver will take up a position dependent upon the relative values and directions of the direct current electromotive forces applied to the armature coils of the receiver. Therefore, if the field winding 15 is connected to a direct current supply source and direct electromotive forces are applied to the coils 16$^a$, 16$^b$ and 16$^c$ having relative values and directions which are the same as the relative values and directions of the alternating electromotive forces induced in the coils of the transmitter 13$^a$, 13$^b$ and 13$^c$, then the field winding 15 on the rotor of the receiver will be turned to an angular position corresponding to the position of the field winding of the transmitter.

In carrying out my invention I control by means of radiated energy the relative values of direct current electromotive forces applied to the armature of the receiver in accordance with the relative values of the alternating electromotive forces induced in the armature of the transmitter.

Connected across the terminals of coils 13$^a$, 13$^b$ and 13$^c$ of the transmitter are the movable coils 17, 18 and 19 of three alternating current relays. The coils 17, 18 and 19 are shown connected in Y to the armature 13, although they may obviously be connected directly across the armature coils respectively. They are carried on pivoted contact arms 20, 21 and 22, respectively, which bear on suitable rotating contact drums 23, 24 and 25, and also on stationary conducting arcs 20$^a$, 20$^b$ and 20$^c$ which are connected to ground. The stationary coils 26, 27 and 28 of the three relays are connected to the supply source 12.

The contact arms 20, 21 and 22 control the energy impulses sent out from three antennæ 36, 37 and 38 which are tuned to different wave lengths. For example, the antennæ may be energized respectively by means of high frequency alternators 29, 30 and 31 which are connected in series with the antennæ to ground. Each contact drum comprises four V-shaped segments. Two of the segments 32 are made of a suitable electrical conducting material, such as brass. These conducting segments are electrically connected to the high sides, i. e. ungrounded sides, of the alternators. The other two segments are made of a suitable insulating material, such as hard rubber or mica. The segments are secured to the outer surface of a drum so as to point in opposite directions, the two conducting segments being diametrically opposite each other as are also the two insulating segments. These drums are rotated at the same speeds by constant speed electric motors 33, 34 and 35 or other suitable means.

As the contact drums are rotated by the motors, it will be observed that the relative duration of engagement of each contact arm with the electrically conducting and insulating segments is dependent on the position of the contact arm lengthwise of the drum. When the arm is moved on its pivot to engage the upper end of the drum, as viewed in the drawing, it will be in continuous engagement with the insulating segments, and when it is moved to engage the lower end of the drum it will be in continuous engagement with the conducting segments. When each contact arm is in a position midway of the length of the drum, it engages the conducting and insulating segments alternately, the duration of engagement with the conducting segments being equal to the duration of engagement with the insulating segments.

The positions of the arms are dependent on the polarity and degree of energization of coils 17, 18 and 19 which are energized from the armature winding 13 in accordance with the position of field winding 11. When each contact arm rests on a conducting segment the corresponding alternator is short-circuited so that no energy is radiated, but when the contact arm rests on an insulating segment energy will be radiated. The contact arms are each biased to a position midway of the length of its drum by suitable means, such as springs, (not shown) and when the electromotive force impressed on a movable coil 17, 18 or 19 of a contact arm is zero, the contact arm will move to this mid-position in accordance with its bias and consequently the duration of the radiated impulses sent out from the antenna will be equal to the time interval between the impulses. When the electromotive force impressed on the movable coils 17, 18 or 19 is a maximum in one direction, the corresponding contact arm will be moved by the electromagnetic repulsion between the movable coil and its cooperating stationary coil 26, 27 and 28 to engage with one end of the drum, for example the upper end, and when the electromtoive force impressed on a movable coil is a maximum in the opposite direction the contact arm will be moved to engage with the lower end of its drum. It will thus be observed that the electromotive forces induced in the coils of the armature 13 are converted into radiated electromagnetic impulses, the time ratio of duration of these impulses being dependent on the direction and intensity of the electromotive forces induced in the armature coils.

These radiated impulses are received at the point of location of the receiver 14 by means of an antenna 40 and three receiving sets 41, 42 and 43 of suitable form which are tuned respectively to the wave lengths of the impulses sent out at the transmitting stations 36, 37 and 38. These receiving sets are connected to relay coils 44, 45 and 46 respectively which operate armatures 47, 48 and 49 moving between pairs of stationary contacts 50, 51 and 52 respectively. When radiated impulses are being received, the contact arms are pulled down in engagement with the lower contacts and when no radiated impulses are being sent out and received the contact arms are pulled upward, by suitable springs, into engagement with the upper contacts. The upper contact of each pair is electrically connected to a conductor 53, the lower contacts of each pair are connected to a conductor 54, and the armatures 47, 48 and 49 are connected to a conductor 55. Interposed in the connections between the armatures and the conductor 55 are condensers 59, 60 and 61 respectively. The conductors 53 and 54 are connected to a suitable source of direct current supply such as the terminals of a battery 62 and the supply main 55 is connected to a central tap on the battery 62.

The field coil 15 of the receiver 14 is connected across the supply mains 53 and 54 and the terminals of the armature winding 16 of the receiver are connected respectively to the same sides of the condensers as the armatures 47, 48, and 49. As shown, the terminal of coil 16$^a$ is connected to the condenser 60, the terminal of coil 16$^b$ to the condenser 59, and the terminal of coil 16$^c$ to the condenser 61. The common point of connection of the three armature coils is connected directly to the supply main 55. It will thus be observed that the coils 16$^a$, 16$^b$ and 16$^c$ are connected across the condensers 60, 59 and 61 respectively.

With this arrangement of the receiving apparatus, the condensers 59, 60 and 61 will be alternately given positive and negative charges depending on the positions of the armatures 47, 48 and 49. When the armatures are in engagement with the upper contacts, the condensers may be given a positive charge, for example, and when they are in engagement with the lower contacts the condensers will be given a negative charge. It will be understood that the three armatures operate independently of each other and may not occupy corresponding positions at any particular time. The resulting charge on each condenser therefore depends on the time ratios of duration of engagement between the corresponding armature and the pair of contacts with which it cooperates. If the armatures are in engagement with the upper contacts for the greater portion of the time, the condensers will have a positive charge while if the armatures are in engagement with the lower contacts a greater portion of the time the condensers will have a negative charge. When the duration of engagement with the upper and lower contacts is the same the condensers will have no charge.

Since armature windings 16$^a$, 16$^b$ and 16$^c$ are connected across the condensers 60, 59 and 61 respectively, they therefore will be energized with a polarity and intensity corresponding to the polarity and the amount of charge on the condensers. When the condenser charge is zero the coil connected across it will not be energized. In this manner it will be observed that the armature coils 16$^a$, 16$^b$ and 16$^c$ will be energized with pulsating direct currents the relative values and directions of which will correspond with the relative values and directions of the electromotive forces induced in the coils 13$^a$, 13$^b$ and 13$^c$ of the transmitter. Therefore, the field coil 15 carried by the rotor of the receiver will be turned to a position corresponding to the position of the field coil 11 of the transmitter whereby the receiver is caused to reproduce any angular movement applied to the transmitter.

While I have described my invention as embodied in concrete form and as operating in a specific manner in accordance with the provisions of the patent statutes it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. The combination with a motion transmitting device and a motion receiving device, of means controlled by said transmitting device for transmitting electromagnetic impulses varying in duration in accordance with the position of said transmitting device, and means responsive to said impulses for causing said motion receiving device to reproduce the movements of said motion transmitting device.

2. The combination with a motion transmitting device, of means controlled by said transmitting device for radiating electromagnetic impulses varying in duration in accordance with the position of said transmitting device, receiving means responsive to said radiated impulses, and means operated by said receiving means for causing said motion receiving device to reproduce the movements of said motion transmitting device.

3. The combination with a motion transmitting device and a motion receiving device, of means for radiating a set of electromagnetic impulses, control means for said radiating means responsive to the movements of said motion transmitting device so as to vary the duration of said electromagnetic impulses in accordance with the movements of said motion transmitting device, receiving means for said impulses, and means controlled by said receiving means for causing said motion receiving device to reproduce the movements of said transmitting device.

4. Means for transmitting motion comprising an electrical motion transmitting device provided with a movable member and arranged to produce an electromotive force varying in accordance with the position of said movable member, means responsive to said electromotive force for radiating electromagnetic impulses varying in duration in accordance with the intensity of said electromotive force, a motion receiving device, and means responsive to said radiated impulses for causing said motion receiving device to reproduce the movements of said motion transmitting device.

5. Means for transmitting motion comprising an electrical motion transmitting device provided with a movable member and arranged to produce a set of electromotive forces varying in accordance with the position of said movable member, means responsive to said electromotive forces for radiating electromagnetic impulses varying in duration in accordance with the intensity of said electromotive forces, remotely situated means responsive to said radiated impulses for reproducing said electromotive forces, and motion receiving means responsive to said reproduced electromotive forces for reproducing the movements of said transmitting device.

6. Means for transmitting motion comprising an electrical motion transmitting device provided with a movable member and arranged to produce a set of electromotive forces varying in relative intensity and direction in accordance with the position of said movable member, means responsive to said electromotive forces for radiating a set of electromagnetic impulses having a relative time ratio of duration corresponding to the intensity and direction of said electromotive forces, remotely situated receiving means responsive to said radiated impulses for reproducing said set of electromotive forces, motion receiving means, and electrical connections whereby said reproduced electromotive forces are applied to said motion receiving means.

7. Means for transmitting angular motion comprising a motion transmitting device arranged to produce a set of electromotive forces varying in intensity and direction in accordance with the angular position thereof, means responsive to said electromotive forces for radiating a set of electromagnetic impulses having a relative time ratio of duration corresponding to the intensity and direction of said electromotive forces, a remotely situated motion receiving device similar to said transmitting device, and means responsive to said radiated impulses for impressing a set of electromotive forces on said receiving device varying in intensity and direction in accordance with the time ratio of duration of said radiated impulses.

8. Means for transmitting angular motion comprising an electrical motion transmitting device provided with stator and rotor members, windings on said members, a source of alternating current supply connected to one of said windings whereby electromotive forces are induced in the other of said windings varying in intensity and direction in accordance with the angular relation of said windings, means responsive to said electromotive forces for radiating electromagnetic impulses with a time ratio of duration varying in accordance with the intensity and direction of said electromotive forces, a remotely situated motion receiving device similar to said transmitting device, and means responsive to said radiated impulses for impressing electromotive forces on said receiving device varying in intensity and direction in accordance with the time ratio of duration of said radiated impulses whereby said receiving device is caused to repeat the movements of said transmitting device.

9. Means for transmitting angular motion comprising an electrical motion transmitting device provided with stator and rotor members, a field winding on one of said members, an armature winding on the other of said members in which electromotive forces are induced by said field winding varying in intensity and direction in accordance with the angular position of said rotor member, means for radiating electromagnetic impulses, means responsive to the intensity and direction of said electromotive forces for varying the time ratio of duration of said radiated impulses, a remotely situated motion receiving device similar to said transmitting device, and means responsive to said radiated impulses for applying electromotive forces to said receiving device varying in intensity and direction in accordance with the time ratio of duration of said radiated impulses whereby said receiving device is caused to repeat the movements of said transmitting device.

10. Means for transmitting angular motion comprising an electrical motion transmitting device provided with stator and rotor members, a polycircuit armature winding on one of said members, a single circuit field winding on the other of said members, a source of alternating current supply connected to said field winding whereby alternating electromotive forces are induced in the circuits of said armature winding varying in relative intensity and direction in accordance with the position of said rotor member, means for transmitting said electromotive forces separately to a distance in terms of electromagnetic radiated impulses, the time ratio of duration of which varies in accordance with the intensity and direction of said electromotive forces, a plurality of distant receiving devices separately responsive to said radiated impulses, means controlled by said receiving devices for reproducing said electromotive forces, a motion receiving device similar to said transmitting device, and electrical connections whereby said reproduced electromotive forces are applied to said motion receiving device.

11. Means for transmitting angular motion comprising an electrical motion transmitting device provided with stator and rotor members, a polycircuit armature winding on one of said members, a single circuit field winding on the other of said members, a source of alternating current supply connected to said field winding whereby alternating electromotive forces are induced in the circuits of said armature winding varying in relative intensity and direction in accordance with the position of said rotor member, means for transmitting said electromotive forces separately to a distance in terms of electromagnetic radiated impulses, the time ratio of duration of which varies in accordance with the intensity and direction of said electromotive forces, a plurality of distant receiving devices separately responsive to said radiated impulses, a motion receiving device having polycircuit armature and single circuit field windings, a source of direct current supply connected to the field winding of said receiving device, a condenser connected across the circuits of said motion receiving device armature winding, and contact devices controlled by said receiving means so as to charge said condensers from said supply source with a polarity and intensity corresponding to the time ratio of direction of said radiated impulses, whereby direct electromotive forces are impressed on the circuits of the armature winding of said receiving device corresponding in relative intensity and directions with the alternating electromotive forces induced in the armature winding of said transmitting device, the rotor of said reproducer being thereby caused to turn to a position corresponding to the position of said transmitting device.

12. Means for transmitting angular motion comprising an electrical motion transmitting device provided with stator and rotor members, a polycircuit armature winding on one of said members, single circuit field winding on the other of said members, a source of alternating current supply connected to said field winding whereby alternating electromotive forces are induced in the circuits of said armature winding varying in relative intensity and direction in accordance with the position of said rotor member, means for transmitting said electromotive forces separately to a distance in terms of electromagnetic radiated impulses, the time ratio of duration of which varies in accordance with the intensity and direction of said electromotive forces, a plurality of distant receiving devices separately responsive to said radiated impulses, a motion receiving device having polycircuit armature and single circuit field windings, a source of direct current supply connected to the field winding of said motion receiving device, condensers connected across the circuits of the armature winding, of said motion receiving device, a plurality of contact arms operated by said impulse receiving devices respectively, pairs of contacts between which said contact arms oscillate in accordance with the time ratio of duration of said electromagnetic impulses, connections between said pairs of contacts and opposite terminals of said direct current supply source, connections including said condensers between said contact arms and a central tap on said supply source whereby said condensers are charged with a polarity and intensity corresponding to the time ratio of duration of said radiated impulses and electromotive forces thereby impressed on the circuits of the armature winding of the said motion receiving device corresponding in relative intensity and direction with the alternating electromotive forces induced in the armature winding of said transmitting device, said motion receiving device being thereby caused to take up a position corresponding with the position of said transmitting device.

In witness whereof, I have hereunto set my hand this 26th day of November 1924.

ERNST F. W. ALEXANDERSON.